United States Patent Office 3,659,008
Patented Apr. 25, 1972

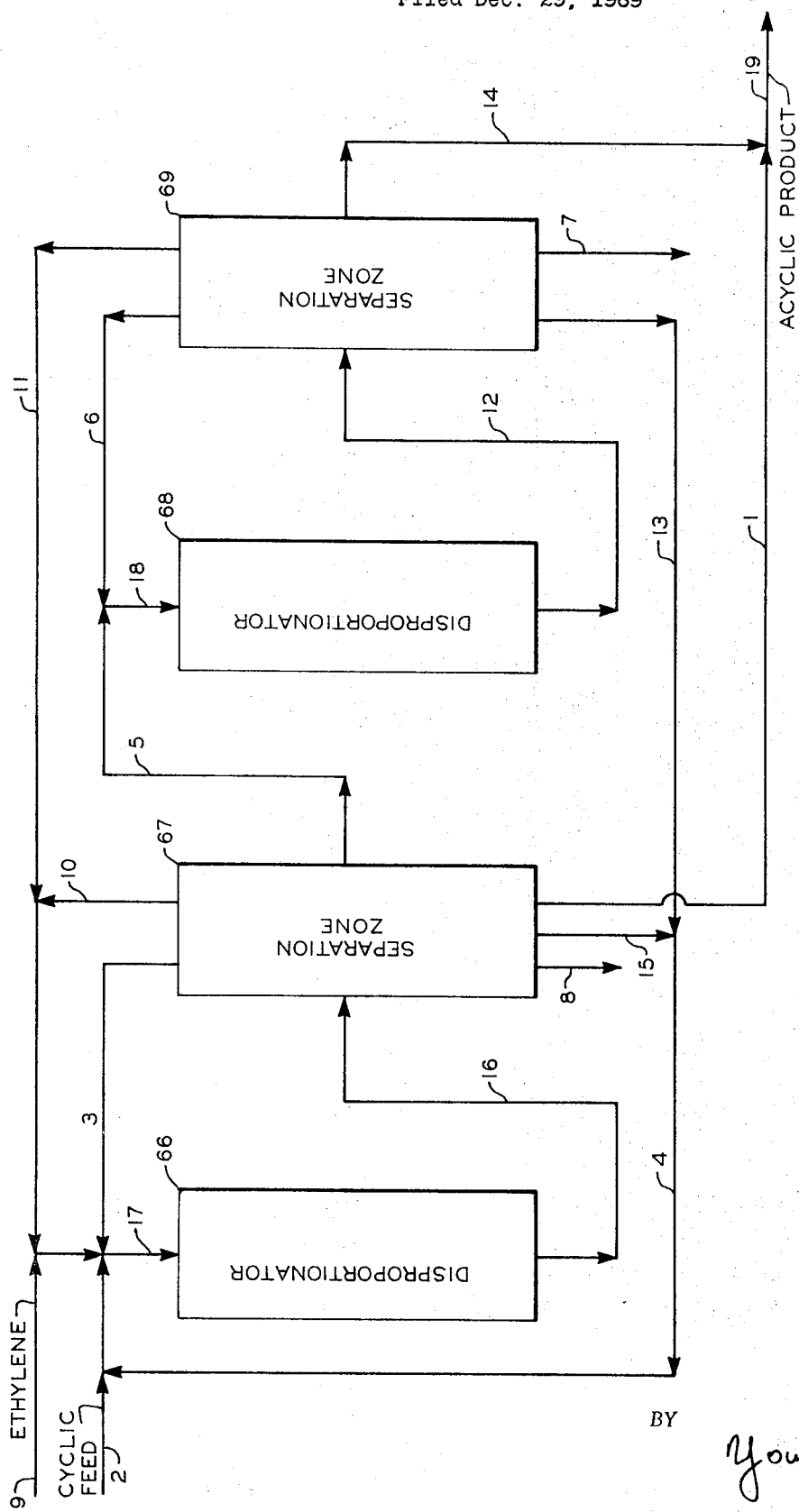

3,659,008
NON-CONJUGATED ACYCLIC POLYENES BY WAY OF OLEFIN DISPROPORTIONATION
Donald H. Kubicek and Robert E. Reusser, Bartlesville, Okla., assignors to Phillips Petroleum Company
Filed Dec. 29, 1969, Ser. No. 888,592
Int. Cl. C07c *11/02, 3/00*
U.S. Cl. 260—677                    6 Claims

ABSTRACT OF THE DISCLOSURE

Non-conjugated acyclic olefins are prepared by olefin disproportionation of ethylene and a non-conjugated cyclic olefin, the desired acyclic olefin is recovered, and lighter acyclic olefin is conducted to a second olefin disproportionation zone wherein the lighter olefin is converted to additional quantities of the desired acyclic olefin product. Heavier acyclic olefins are conducted to the first olefin disproportionation zone.

BACKGROUND OF THE INVENTION

Field of the invention

This invention relates to non-conjugated olefins. In a further aspect, the invention relates to a process of preparing non-conjugated acyclic olefins. In a still further aspect, the invention relates to a process of preparing non-conjugated acyclic olefins having four carbon atoms between adjacent double bonds from non-conjugated cyclic olefins using olefin disproportionation chemistry.

Description of the prior art

The reaction of olefinic materials to produce other olefinic materials wherein the reaction can be visualized as the breaking of two existing double bonds between first and second carbon atoms, and between third and fourth carbon atoms, respectively, and the formation of two new existing bonds, such as between the first and third carbon atoms and the second and fourth carbon atoms, respectively, and wherein the two existing double bonds can be on the same or different molecules, has been called "the olefin reaction." The breaking and formation of these double bonds can be visualized by using a mechanistic scheme involving a cyclobutane intermediate. Thus, two unsaturated pairs of carbon atoms combine to form a four-center (cyclobutane) intermediate which then dissociates by breaking either set of opposing bonds.

Other terms have been utilized to describe reactions of olefinic materials which are within the scope of the olefin reaction as defined above. These include such terms as "olefin disproportionation," "olefin dismutation," "transalkylidenation," and "olefin metathesis." Throughout this specification and claims, the term "olefin disproportionation" is used as matter of choice, and is deemed to be equivalent to the above-mentioned terms, including "the olefin reaction" terminology. Many catalysts, both heterogeneous and homogeneous, have been reported to effect the olefin disproportionation reaction.

One specific olefin disproportionation reaction is the subject matter of U.S. 3,424,811, Mango (1969). This patent discloses that cyclic olefin reactants having up to 12 carbon atoms in the ring, when combined with acyclic olefin reactants in the presence of an olefin disproportionation catalyst, undergo ring cleavage to form acyclic polyenes. Specifically, Mango discloses that 1,5-cyclooctadiene and ethylene undergo olefin disproportionation to yield 1,5,9-decatriene.

Application of olefin disproportionation chemistry to the preparation of specific olefin products has resulted in some unique problems. Exemplary of this fact is the problems which result in attempts to prepare specific nonconjugated acyclic polyenes from other olefins in a direct process at conversion and selectivity levels which are sufficient to warrant consideration for commercial development. Briefly, these problems include the tendency for acyclic polyenes to undergo secondary disproportionation reactions to produce a polyene both lighter and heavier than desired. There is also a tendency for the acyclic polyenes to revert to the more stable cyclic structure during the olefin disproportionation reaction. This phenomenon can contribute to lower than desired selectivity and ultimate yields. The production of acyclic polyenes other than those desired and the formation of cyclic polyenes other than the feed require that the by-products be disposed of in some other process or application, thus decreasing the economic attractiveness of the specific olefin disproportionation process.

OBJECTS OF THE INVENTION

It is an object of this invention to prepare a class of non-conjugated acyclic olefins from certain non-conjugated cyclic olefins using olefin disproportionation chemistry.

It is a further object of this invention to prepare non-conjugated acyclic polyenes wherein a substantial portion of byproduct material which is both heavier and lighter than the desired non-conjugated acyclic product may be utilized within the olefin disproportionation system to produce more desired product.

Other objects and advantages of the invention will be apparent from reading the disclosure and appended claims.

SUMMARY OF THE INVENTION

The invention comprises a process of preparing a class of non-conjugated acyclic polyenes having four carbon atoms between adjacent double bonds by contacting ethylene and a selected non-conjugated cyclic polylene having four carbon atoms between adjacent double bonds with an olefin disproportionation catalyst to product the desired acyclic polyene as a primary product of the process which is recovered. The first olefin disproportionation step produces substantial amounts of secondary acyclic polyenes which also have four carbon atoms between adjacent double bonds and which can be lighter or heavier than the desired primary product. That is, the secondary polyenes have a shorter or a longer chain length or have a fewer or greater number of double bonds per molecule than the desired primary product. Primary and secondary polyenes are separated and the secondary polyenes are divided, those heavier than the desired product being recycled to the first olefin disproportionation step, and those lighter being subjected to a second olefin disproportionation step. The second disproportionation step produces additional primary polyene, ethylene, and lighter and/or heavier secondary acyclic polyene material. The primary polyene is recovered. The ethylene, heavier secondary product, and any cyclic material are returned to the first olefin disproportionation step and the lighter secondary product is returned to the second olefin disproportionation step.

BRIEF DESCRIPTION OF THE DRAWING

The sole figure of the drawing schematically presents a flow diagram which illustrates one embodiment of the process of the invention.

DETAILED DESCRIPTION OF THE INVENTION

It has been found that, in the present invention, the olefin disproportionation conversion of ethylene and a cyclic polyene having four carbon atoms between adjacent double bonds can produce cyclic and/or acyclic polyene products which also have four carbon atoms between adjacent double bonds. The further olefin disproportionation of these polyenes, either in the presence or absence of ethylene, produces other polyenes which still retain that spacing between double bonds. Thus, except for some side reactions which result in conjugation of double bonds with resultant losses through polymer formation, the present process is capable of efficiently converting a given cyclic polyene to a specific acyclic polyene even though a number of secondary products are possible.

The process of the invention includes two olefin disproportionation steps. In the first step, the cyclic feed polyene undergoes a primary reaction to produce the primary product, i.e., an acyclic polyene having the desired size and the desired number of double bonds per molecule. The primary product is produced by contacting the cyclic feed compound with the olefin disproportionation catalyst in the presence of ethylene. The primary reaction acyclic polyene product contains at least three double bonds, two of which are terminal, and at least one of which is internal. Because of the number of olefinic materials present in the reaction zone, many olefin reaction by-products are possible. Thus, the reaction products of the first olefin disproportionation step comprises unreacted ethylene, unreacted cyclic polyene, primary acyclic polyene product, and secondary acyclic polyene products lighter and/or heavier than the desired primary product.

After separation of the primary acyclic polyenes, the lighter secondary acyclic polyenes are utilized as the feed to a second olefin disproportionation reactor. The ethylene, the longer chain material, and the cyclics are returned to the first reactor. The olefin disproportionation of the lighter acyclic polyenes in the second reactor results in the formation of additional primary acyclic polyene product. The second olefin disproportionation reaction also produces fractions of acyclic polyenes both lighter and/or heavier than the primary reaction product. The second disproportionation step also produces additional quantities of cyclic polyenes and ethylene.

Separation of the effluent of the second olefin disproportionation zone provides a heavier molecular weight acyclic polyene fraction which is then returned to the first olefin disproportionation zone. Within the first olefin disproportionation zone, significant amounts of these heavier molecular weight polyenes are converted to primary and secondary acyclic polyene products. Thus, the recycle of the distillable heavier molecular weight materials of the second olefin disproportionation zone contributes to the ultimate yield of the primary acyclic polyene product. The entire process produces a minimum amount of byproduct requiring further processing.

The cyclic olefins employed as starting materials are 1,5-cyclooctadiene, 1,5,9-cyclododecatriene, and alkyl derivatives thereof. The substituent alkyl groups can contain from 1 to about 12 carbon atoms per radical, and the total number of carbon atoms in the substituted cyclic polyene does not exceed about 20. Exemplary starting materials include 1,5-cyclooctadiene (1,5-COD)
3-methyl-1,5-cyclooctadiene
4-hexyl-1,5-cyclooctadiene
3,5-dimethyl-7-ethyl-1,5-cyclooctadiene
3-dodecyl-1,5-cyclooctadiene
1,5,9-cyclododecatriene (1,5,9-CDT)
4-isobutyl-1,5,9-cyclododecatriene
3-methyl-7-propyl-1,5,9-cyclododecatriene
2,4,7,8-tetramethyl-1,5,9-cyclododecatriene
3-(1,1,3,3-tetramethylbutyl)-1,5,9-cyclododecatriene, and
   the like, and mixtures thereof.

The unsubstituted cyclic polyenes are preferred. These compounds are readily available by way of conventional cyclo-dimerization and cyclo-trimerization techniques. For example, 1,3-butadiene may be easily cyclodimerized to 1,5-cyclooctadiene using the procedure of U.S. 3,250,817, Lapporte (1966).

The molar ratio of ethylene to cyclic and acyclic polyenes in the first olefin disproportionation zone will generally be in the range of from about 1:1 to about 20:1, preferably from about 2:1 to about 10:1.

The olefin disproportionation steps of the invention are carried out using catalysts well known in the art. Any catalyst having activity for the olefin disproportionation reaction can be employed. These include solid (heterogeneous) and solution (homogeneous) catalysts, or combinations thereof. Those catalysts which have little or no double bond isomerization activity are preferred. The double bond isomerization activity is advantageously repressed in the process of the invention to avoid the formation of polyenes having a conjugated unsaturation and thus avoid the formation of efficiency-inhibiting amounts of polymer.

Suitable heterogeneous catalysts include inorganic base-treated, alumina-supported molybdenum oxide, and other catalysts, including, for example, those catalysts disclosed in copending application Ser. No. 627,636, filed Apr. 3, 1967 (Heckelsberg), now U.S. Patent 3,586,731, issued June 22, 1971, and application Ser. No. 856,886, filed Sept. 2, 1969 (Crain and Reusser). Suitable homogeneous catalysts which can be used include

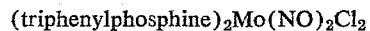

complex in admixture with methylaluminum sesquichloride in the presence of a suitable solvent such as chlorobenzene. Some of the suitable homogeneous catalysts are disclosed in copending applications Ser. No. 810,021, filed Mar. 24, 1969 (Hughes et al.) now U.S. Patent 3,558,-517, issued Jan. 26, 1971; application Ser. No. 717,023, filed Mar. 28, 1968 (Zuech), now U.S. Patent 3,558,518, issued Jan. 26, 1971; application Ser. No. 717,026, filed Mar. 28, 1968 (Kittleman et al.), now U.S. Patent 3,558,-515, issued Jan. 26, 1971; and application Ser. No. 717,-028, filed Mar. 28, 1968 (Zuech), now abandoned in favor of continuation application Ser. No. 137,676, filed Apr. 26, 1971.

Because of the wide variety of catalysts available for use in the olefin disproportionation reaction, the temperatures, pressures, flow rates, molar ratios of catalyst to feed materials, and other operating conditions will vary over a broad range. The physical and chemical properties of the various components of process streams, the properties of the feed material, the optimum temperature, pressure, and contact times for the particular catalyst employed, all effect the operating conditions utilized in the olefin disproportionation reactors and subsequent separation operations. The manipulation of these variables to optimize the process of the invention is within the skill of those in the art. Any suitable reaction techniques can be employed to effect the olefin disproportionation reaction, such as fixed bed reaction, fluidized bed reaction, liquid phase batch and continuous operations, and the like. Conventional methods can be utilized to separate materials in the process streams, including fractionation, crystallization, adsorption, and the like. The apparatus in which the process of the invention can be carried out is well known in the art.

The primary products of the process of the invention are nonconjugated acyclic polyenes having 4 carbon atoms between adjacent double bonds and having at least 10 carbon atoms per molecule. The product can contain alkyl substitution of from 1 to 12 carbon atoms per radical which corresponds to the alkyl substitution on the cyclic polyene starting materials. The maximum number of carbon atoms in the primary reaction product will be about 42. Representative primary products include 1,5,9-decatriene, 1,5,13 - tetradecatriene, 1,5,9,13,17-octadecapentaene, and the like, including alkyl substituted derivatives of these acyclic polyenes.

The primary products of the reaction have established utility as starting materials for the preparation of flame retardant additives for polypropylene, i.e., 1,5,9-decatriene can be brominated to yield the flame retardant 1,2,5,6,9,10-hexabromodecane. This composition is effective at concentrations as low as 1.5 percent by weight. Additionally, 1,5,9 - decatriene can be easily hydrated to the corresponding triol which is useful as a crosslinking agent in epoxy adhesive formulations.

The sole figure in the drawing schematically illustrates the process of the invention. The drawing is described using the conversion of 1,5-cyclo-octadiene to 1,5,9-decatriene primary product as exemplary of the process. The drawing presents two disproportionation reactors 66 and 68 and their corresponding separation units 67 and 69. A cyclic feed (1,5-cyclooctadiene) enters the system in line 2 along with ethylene in line 9 and is introduced via line 17 to the first stage disproportionation reactor 66. The olefin disproportionation reaction provides effluent stream 16, the material therein being separate in zone 67. The separation zone 67 provides a primary product stream 1 (1,5,9-decatriene), a secondary heavier reaction product stream 15 ($C_{14}$ and $C_{18}$ polyenes), a heavy ends stream 8 ($C_{18+}$), an unconverted ethylene stream 10, an unconverted cyclic feed stream 3, and a secondary lighter reaction product stream 5 (1,5-hexadiene). Lines 10 and 3 return unconverted ethylene and unconverted feed cyclic polyene, respectively, to line 17 and reactor 66. Line 15 communicates with line 4 for return of the distillable heavier acyclic polyenes into line 2 and subsequently into reactor 66. Line 8 removes undesirable heavy ends from the system. Primary product 1,5,9-decatriene in line 1 is subsequently combined with additional product from line 14 and is recovered through line 19.

The lighter secondary reaction products (1,5-hexadiene) are introduced by way of lines 5 and 18 into second stage olefin disproportionation reactor 68. The effluent from reacter 68 is passed to separation zone 69. Zone 69 provides an overhead ethylene stream 11 which is combined with stream 10 and returned to reactor 66. Unconverted lighter secondary products (1,5-hexadiene) are returned to reactor 68 via lines 6 and 18. Heavy ends are removed from zone 69 by line 7, and distillable heavier acyclic nonconjugated polyenes, together with any cyclic polyenes, are returned to reactor 66 by way of lines 13, 4 and 2. Primary product (1,5,9-decatriene) is removed via line 14, combined with product from line 1, and removed by line 19.

In the simplified schematic flow diagram of the drawing, the charging, separation, and recycle of catalyst components and solvents (if any) are not shown to simplify presentation of the invention. These procedures are well known in the art and will vary, depending on the specific catalyst system employed. For the same reasons, discussion of the operation of conventional items such as pumps, heat exchangers, valves, specific separators such as fractionators of various kinds, has been intentionally omitted to simplify understanding of the process of the invention.

The invention can be further understood by reference to the following illustrations.

ILLUSTRATIVE EXAMPLE I

The triene, 1,5,9-decatriene, is produced in accordance with the process as depicted schematically in the drawing, by reacting 1,5-cyclooctadiene and ethylene.

The first stage olefin disproportionation reactor 66 uses as a catalyst a homogeneous system of $$(pyridine)_2(NO)_2Cl_2Mo$$

admixed with methyl-aluminum sesquichloride in a 1:10 mole ratio. This catalyst is prepared in accordance with the procedures of U.S. application Ser. No. 717,023, filed Mar. 28, 1968 (Zuech). The solvent is chlorobenzene in about a 2:1 ratio of solvent to feed. The ratio of catalyst to cyclic feed material is about 1:25 in the reactor. A residence time of five hours, a temperature of about 27° C., and a pressure of 500 p.s.i.g. is employed.

The catalyst, solvent, and conditions utilized in the second stage olefin disproportionation reactor 68 are identical to the first reactor with the exception that atmospheric pressure is employed. The composition of the various streams as depicted in the drawing is summarized in Table I.

TABLE I

| Stream:[1] | Ethylene | 1,5-cyclo-octadiene | 1,5-hexadiene | 1,5,9-decatriene | Recycle ($C_{14}$,$C_{18}$) | Heavy ends ($C_{18+}$) |
|---|---|---|---|---|---|---|
| 1 | | | | 112.31 | | |
| 2 | | 108.00 | | | | |
| 3 | | 15.00 | | | | |
| 4 | | | | | 19.10 | |
| 5 | | | 15.87 | | | |
| 6 | | | 12.39 | | | |
| 7 | | | | | | 0.06 |
| 8 | | | | | | 16.32 |
| 9 | 28.00 | | | | | |
| 10 | 24.62 | | | | | |
| 11 | 3.18 | | | | | |
| 12 | 3.18 | | 12.39 | 7.21 | 5.32 | 0.06 |
| 13 | | | | | 5.32 | |
| 14 | | | | 7.21 | | |
| 15 | | | | | 13.78 | |
| 16 | 24.62 | 15.00 | 15.87 | 112.31 | 13.98 | 16.42 |
| 17 | 55.80 | 123.00 | | | 19.10 | |
| 18 | | | 28.26 | | | |
| 19 | | | | 119.52 | | |

[1] Pounds per hour.

ILLUSTRATIVE EXAMPLE II

The preparation of some of the preferred primary products of applicants' process can be conveniently illustrated in tabular form (Table II). This table illustrates some of the process modifications which are within the scope of the present invention.

TABLE II.—PROCESS MODIFICATIONS—NON-CONJUGATED ACYCLIC POLYENES

| Desired primary product | Stream— | | | | | |
|---|---|---|---|---|---|---|
| | 2 | 3 | 4 | 5 | 6 | |
| | Cyclic feed | Recycle to disproportionation reactor 66 [1] | Recycle to disproportionation reactor 66 [1] | Feed to disproportionation reactor 68 | Recycle to disproportionation reactor 68 | |
| 1,5,9-decatriene | {1,5-COD<br>{1,5,9-CDT | 1,5-COD<br>1,5,9-CDT | $C_{14}$, $C_{18}$, $C_{22}$<br>$C_{14}$, $C_{18}$, $C_{22}$ | $C_6$<br>$C_6$ | $C_6$<br>$C_6$ | |
| 1,5,9,13-tetradecatetraene | {1,5-COD [2]<br>{1,5,9-CDT | (1,5-COD)[2]<br>1,5,9-CDT | $C_{18}$, $C_{22}$<br>$C_{18}$, $C_{22}$ | $C_6$, $C_{10}$, (1,5-COD)[2]<br>$C_6$, $C_{10}$ | $C_6$, $C_{10}$, (1,5-COD)[2]<br>$C_6$, $C_{10}$ | |
| 1,5,9,13,17-octadecapentaene | {1,5-COD<br>{1,5,9-CDT | None.[3]<br>1,5,9-CDT | $C_{22}$<br>$C_{22}$ | $C_6$, $C_{10}$, $C_{14}$, 1,5-COD<br>$C_6$, $C_{10}$, $C_{14}$ | $C_6$, $C_{10}$, $C_{14}$, 1,5-COD<br>$C_6$, $C_{10}$, $C_{14}$ | |

[1] All cyclic polyenes, as well as the acyclic polyenes shown below, are also recycled to disproportionation 66.
[2] The 1,5-COD can be recycled to disproportionation 66 or passed to disproportionation 68 or divided between the two.
[3] The 1,5-COD is preferably passed on to the disproportionation 68.

The above table illustrates the versatility of applicants' process in preparing non-conjugated acyclic polyenes having four carbon atoms between adjacent double bonds from cyclic olefin feeds.

Reasonable variations and modifications of our invention are possible without departing from the spirit and scope thereof. The experimental data included herein is for the purpose of illustration, and should not be construed as unduly limiting the scope of our invention.

We claim:
1. A process of preparing non-conjugated acyclic polyenes having four carbon atoms between adjacent double bonds which comprises
   (a) disproportionating ethylene and a cyclic polyene having four carbon atoms between adjacent double bonds, which is 1,5-cyclooctadiene, 1,5,9-cyclodo- decatriene, and alkyl derivatives thereof wherein the substituent alkyl group contains from 1 to about 12 carbon atoms per radical and the total number of carbon atoms in the substituted cyclic polyene does not exceed about 20, to provide a first reaction effluent comprising said acyclic polyenes, and heavier and lighter secondary polyenes having a shorter and longer chain length or having fewer or greater double bonds than said acyclic polyenes, (b) recovering said acyclic polyenes as product of the process, (c) separating said secondary polyenes into a fraction heavier than said acyclic polyenes and a fraction lighter than said acyclic polyenes, (d) disproportionating the lighter secondary polyenes to provide an effluent comprising said acyclic polyenes, ethylene, said lighter secondary polyenes, and said heavier secondary polyenes, (e) returning the ethylene and heavier secondary polyenes to step (a), and the lighter secondary polyenes to step (d), and (f) recovering additional quantities of said acyclic polyenes produced in step (d) as a product of the process.

2. A process according to claim 1 wherein the separated heavier secondary polyenes of step (c) are returned to step (a).

3. A process according to claim 1 wherein the non-conjugated polyene product of the process has alkyl substitution containing from 1–12 carbon atoms per radical which corresponds to the alkyl substitution on the cyclic polyene starting material, and said non-conjugated acyclic polyene has up to 42 carbon atoms per molecule.

4. A process according to claim 1 wherein the non-conjugated cyclic polyene is 1,5-cyclooctadiene or 1,5,9-cyclododecatriene, and the non-conjugated acyclic polyene is 1,5,9-decatriene; 1,5,9,13-tetradecatriene; or 1,5,9,13,17-octadecapentaene.

5. A process according to claim 4 wherein the non-conjugated cyclic polyene is 1,5-cyclooctadiene and the non-conjugated acyclic polyene polyene product of the process is 1,5,9-decatriene; 1,5,9,13-tetradecatriene; and 1,5,9,13,17-octadecapentaene.

6. A process according to claim 5 wherein the non-conjugated acyclic polyene product of the process is 1,5,9-decatriene.

References Cited

UNITED STATES PATENTS

| 3,424,811 | 1/1969 | Mango | 260—680 |
| 3,527,828 | 10/1970 | Mango | 260—677 |
| 3,391,212 | 7/1968 | Napolitano et al. | 260—677 |
| 3,296,330 | 1/1967 | Sherk | 260—683 |
| 3,530,196 | 9/1970 | Singleton et al. | 260—680 |

FOREIGN PATENTS

| 1,043,143 | 9/1966 | Great Britain | 260—680 |
| 6702703 | 8/1967 | Netherlands | 260—677 |

DELBERT E. GANTZ, Primary Examiner

J. M. NELSON, Assistant Examiner

U.S. Cl. X.R.

260—683 D, 666 A